(12) United States Patent
Edwards (10) Patent No.: US 8,708,369 B2
(45) Date of Patent: Apr. 29, 2014

(54) TOWED VEHICLE PROTECTION DEVICE (76) Inventor: Jerry A. Edwards, Portland, OR (US)

( * ) Notice: Subject to any disclaimer, the term of this patent is extended or adjusted under 35 U.S.C. 154(b) by 22 days.

(21) Appl. No.: 11/760,653

(22) Filed: Jun. 8, 2007

(65) Prior Publication Data
US 2008/0303259 A1    Dec. 11, 2008

(51) Int. Cl.
B60D 1/60    (2006.01)

(52) U.S. Cl.
USPC ........................ 280/770; 280/507; 150/166

(58) Field of Classification Search
USPC ............... 280/507, 770, 768, 847, 848, 159; 150/166; 296/136.01
See application file for complete search history.

(56) References Cited

U.S. PATENT DOCUMENTS

| | | | | |
|---|---|---|---|---|
| 3,659,874 A | * | 5/1972 | Rendessy | 280/455.1 |
| 3,746,366 A | * | 7/1973 | Bruce et al. | 280/851 |
| 3,782,762 A | * | 1/1974 | Nagy et al. | 280/507 |
| 3,873,044 A | * | 3/1975 | Flower | 242/147 R |
| 4,711,461 A | * | 12/1987 | Fromberg | 280/494 |
| 5,131,188 A | * | 7/1992 | Hutchison et al. | 49/404 |
| 5,609,350 A | * | 3/1997 | Chumley et al. | 280/476.1 |
| 5,799,456 A | * | 9/1998 | Shreiner et al. | 52/396.04 |
| 5,829,775 A | * | 11/1998 | Maxwell et al. | 280/507 |
| 6,022,038 A | * | 2/2000 | Maxwell et al. | 280/507 |
| 6,099,035 A | * | 8/2000 | Garvin, III | 280/769 |
| 6,196,587 B1 | * | 3/2001 | Sage | 280/770 |
| 6,698,794 B2 | * | 3/2004 | Trampe | 280/770 |
| 6,701,760 B1 | * | 3/2004 | Elliason | 70/256 |
| 6,857,652 B2 | * | 2/2005 | Dougherty | 280/507 |
| 6,886,968 B1 | * | 5/2005 | Hamelink et al. | 362/485 |
| 6,994,362 B2 | * | 2/2006 | Foster | 280/163 |
| 7,086,661 B1 | * | 8/2006 | Osborn | 280/507 |
| 7,219,928 B2 | * | 5/2007 | Auger | 280/777 |

* cited by examiner

Primary Examiner — Frank Vanaman
(74) Attorney, Agent, or Firm — ATIP Law; Ian Burns (57) ABSTRACT A protection device for a towed vehicle. The protection device includes a moveable support. The moveable support is adapted to be coupled with a towing vehicle member. A fixed support is adapted to be coupled with a towed vehicle member. A flexible material is coupled between the moveable support and the fixed supports. A biasing device is coupled with the moveable support. The biasing device allows the moveable support to move and maintains the flexible material in a taut condition.

8 Claims, 7 Drawing Sheets

TOWED VEHICLE PROTECTION DEVICE

BACKGROUND

1. Field of the Invention

The present invention relates to devices for protecting the exterior of a vehicle from damage caused by road debris. In particular, the present invention relates to a protection device for protecting a towed vehicle from damage while being towed.

2. Description of the Related Art

A towing vehicle is typically connected to a towed vehicle through a trailer hitch, a coupler and a tow bar or trailer tongue. The distance between the towed vehicle and the towing vehicle is typically small, on the order of 8 to 10 feet. At this distance, small rocks, stones, dirt and other road debris are lifted by the tires of the towing vehicle and cart impact upon the front, top and sides of the towed vehicle exterior. The impact of the rocks and other mad debris can cause damage to the exterior finish of the towed vehicle and to any exposed glass such as a windshield or headlights on the towed vehicle.

Motorhomes can tow a smaller vehicle such as a car that can be used once the motor home reaches a destination. The towed car or vehicle is connected to the motorhome through a tow bar. The tow bar is mounted to the frame of the vehicle being towed and is also connected with the hitch of the motorhome. Because motorhomes are large vehicles and typically have larger tires, they can generate large amounts of debris that can impact and hit the exterior of the towed vehicle being towed behind the motorhome.

For a user towing a vehicle, such as a car behind a motorhome, it is desirable to be able to connect the vehicle quickly to the motorhome for towing. In the same manner, it is desirable to be able to quickly disconnect the towed vehicle once the motor home reaches a destination.

What has long been needed is a protection device for a towed vehicle that can protect a towed vehicle from road debris and that can be quickly deployed and also quickly stored.

SUMMARY

Advantages of One or More Embodiments of the Present Invention

The various embodiments of the present invention may, but do not necessarily, achieve one or more of the following advantages;

provide a device that can protect a towed vehicle from damage;

provide a protection device that can prevent stones and road debris from impacting on the exterior of a vehicle being towed;

provide a protection device for a towed vehicle that can quickly be installed for use;

provide a protection device for a towed vehicle that can quickly be stored away after use;

provide a method of protecting a vehicle being towed;

provide a material mounted between a towed vehicle and a towing vehicle that can flex as the vehicles turn;

provide a flexible material that minimizes flapping during travel; and provide a biasing device that can maintain a flexible material in a taut condition.

These and other advantages may be realized by reference to the remaining portions of the specification, claims, and abstract.

Brief Description of Embodiments of the Present Invention

The present invention comprises a protection device for a towed vehicle. The protection device includes a moveable support. The moveable support is adapted to be coupled with a towing vehicle member. A fixed support is adapted to be coupled with a towed vehicle member. A flexible material is coupled between the moveable support and the fixed supports. A biasing device is coupled with the moveable support. The biasing device allows the moveable support to move and maintains the flexible material in a taut condition.

The present invention also includes a method of protecting a towed vehicle. The method includes attaching a moveable support to a towing vehicle and attaching a fixed support to a towed vehicle. A flexible member is attached between the moveable support and the fixed support. The moveable support is biased with a biasing device.

The above description sets forth, rather broadly, a summary of embodiments of the present invention so that the detailed description that follows may be better understood and contributions of the present invention to the art may be better appreciated. Some of the embodiments of the present invention may not include all of the features or characteristics listed in the above summary. There may be, of course, other features of the invention that will be described below and may form the subject matter of claims. In this respect, before explaining at least one embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to he understood that the phraseology and terminology employed herein are for the purpose of description and should not be regarded as limiting.

DETAILED DESCRIPTION

In the following detailed description of the embodiments, reference is made to the accompanying drawings, which form a part of this application. The drawings show, by way of illustration, exemplary embodiments in which the invention may be practiced. It is to be understood that other embodiments may be utilized and/or structural changes may be made without departing from the scope of the present invention.

Figure 1:
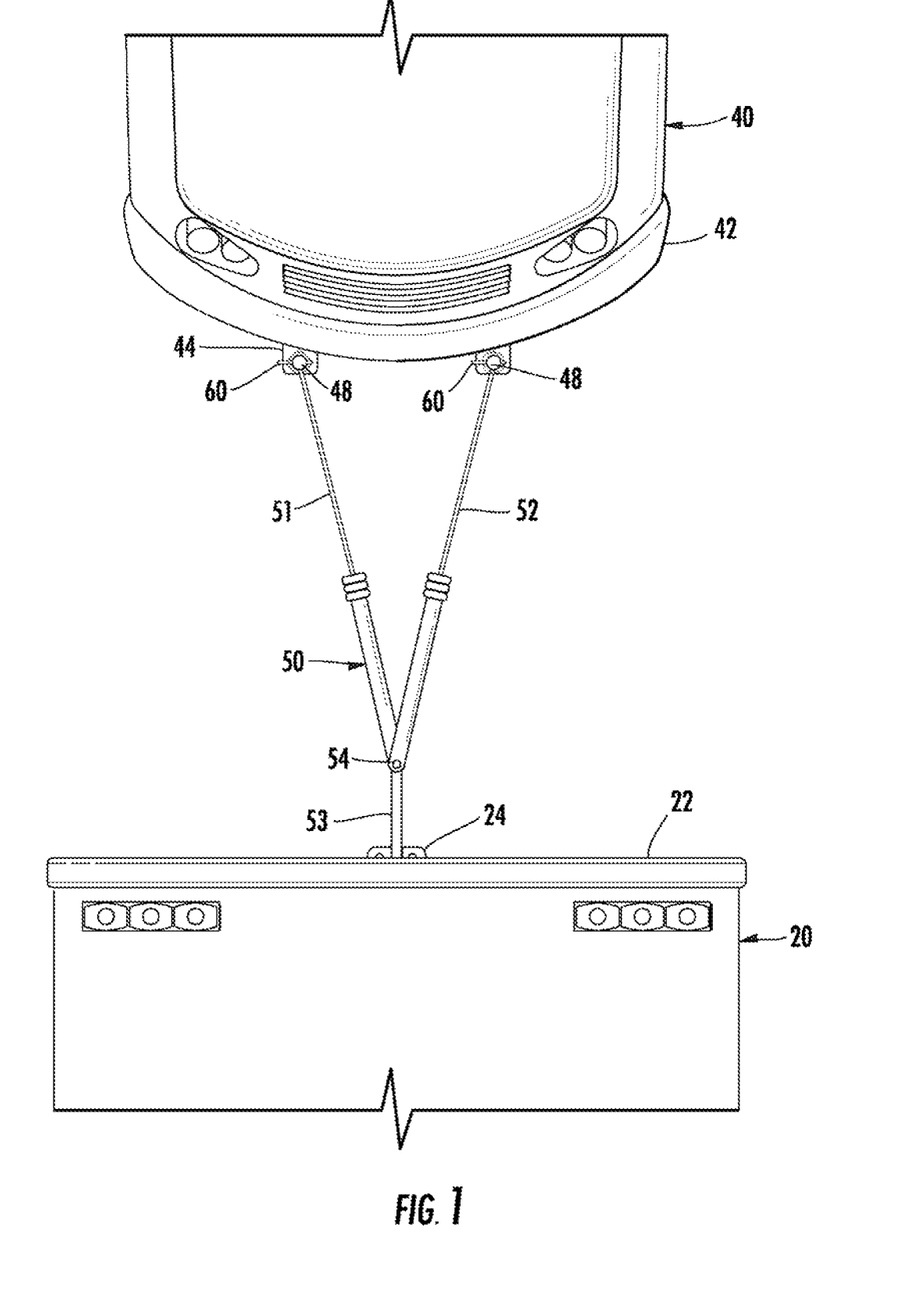
FIG. 1 is substantially a top view of a towing vehicle and a towed vehicle.

Referring to FIG. 1, a towing vehicle 20 is shown. Towing vehicle 20 can be any suitable vehicle that can tow a trailer or a towed vehicle. Towing vehicle 20 can be a car, truck, van or motor home. Towing vehicle 20 has a back end 22. A towing vehicle member such as a conventional trailer hitch 24 can be mounted to the frame of towing vehicle 20 and extend outwardly from back 22. Trailer hitch 24 may be a receiver type hitch that is adapted to receive a hitch extension or towbar stinger 53.

Towed vehicle 40 can be any suitable vehicle that can be towed. Towed vehicle 40 can be a trailer, car, truck or van. Towed vehicle 40 has a front end 42. A pair of attachment devices or towbar brackets 44 are mounted to front end 42. Towbar brackets 44 may be mounted to front end 42 by the use of a suitable fastener. For example, brackets 44 may be attached to the frame of towed vehicle 40 using bolts (not shown). Towbar brackets 44 can have a stud 48 that extends upwardly.

Another towing vehicle member such as towbar 50 can be used to connect the towed vehicle 40 with the towing vehicle 20. Towbar 50 allows the towing vehicle 20 to pull towed vehicle 40. Towbar 50 has arms 51 and 52. Arms 51 and 52 are rotatably connected by a pin 54 to towbar stinger 53. Pin 54 allows arms 51 and 52 to pivot with respect to towbar stinger 53. The other end of arms 51 and 52 are connected to studs 48 and retained by a lynch pin 60. Arms 51 and 52 can also rotate about studs 48. Pin 54 and studs 48 allow towed vehicle 40 to turn more easily while being pulled by towing vehicle 20.

Figure 2:
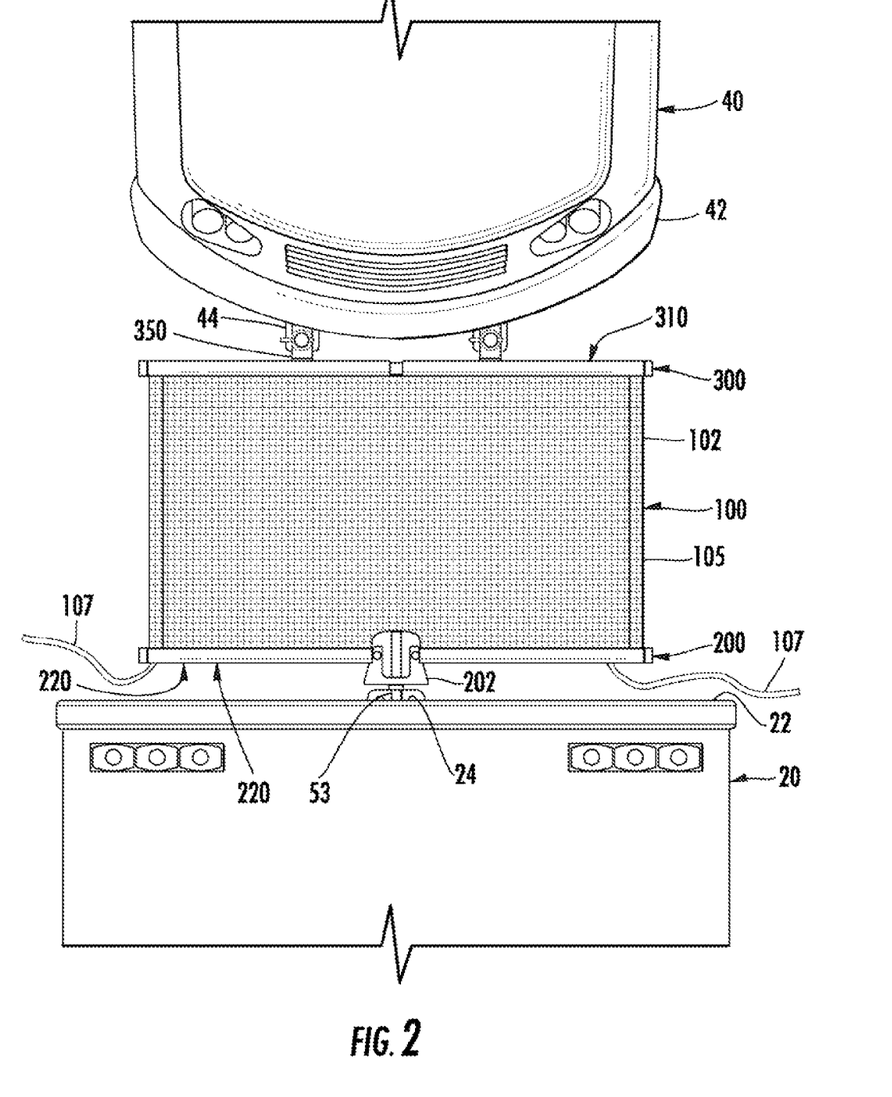
FIG. 2 is substantially a top view of a towed vehicle protection device in accordance with the present invention installed between a towing vehicle and a towed vehicle.
Figure 4:
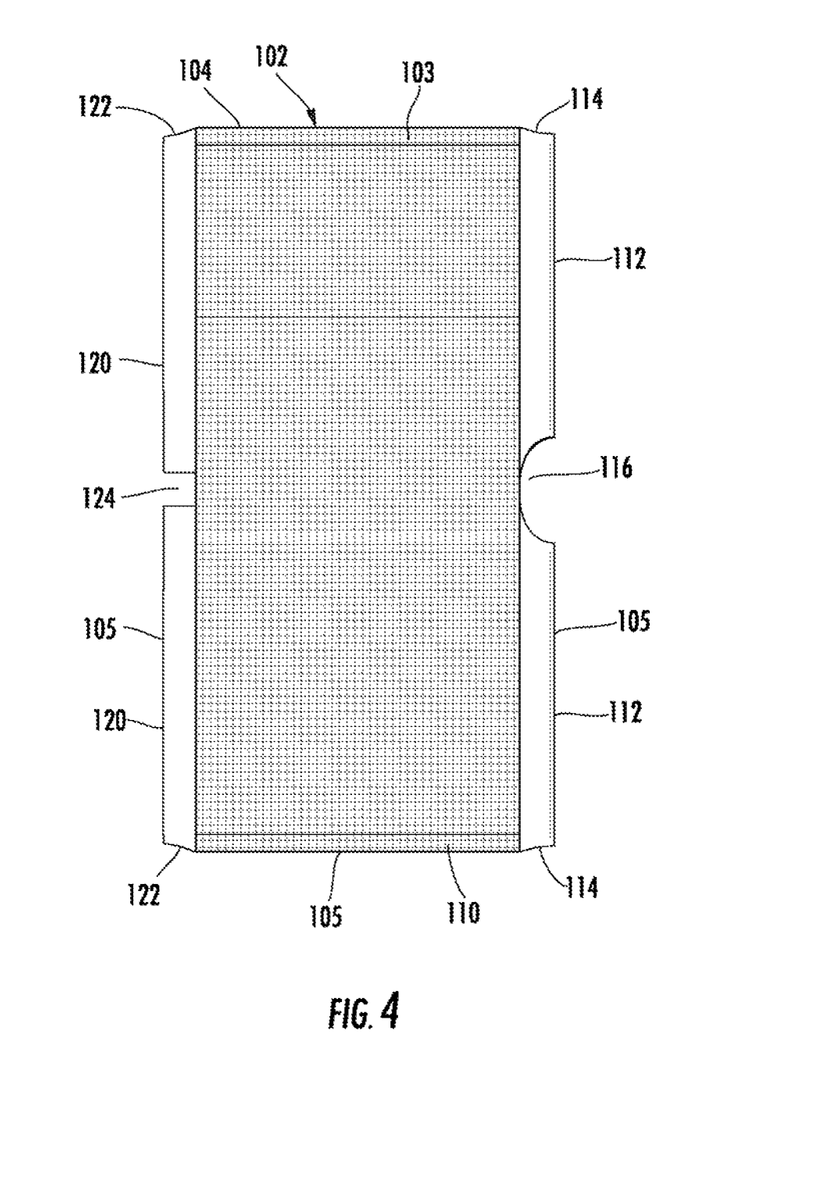
FIG. 4 is substantially an enlarged view of a flexible material in the towed vehicle protection device of FIG. 3.

With reference now to FIGS. 2 and 4, a protection device 100 can be mounted between towing vehicle 20 and towed vehicle 40. Protection device 100 can protect towed vehicle 40 from damage due to rocks and road debris being lifted by the tires of towing vehicle 20 and deposited on towed vehicle 40 while both vehicles are in motion.

Protection device 100 can include a material means, such as planar flexible material or fabric 102. Flexible material 102 can be formed from a wide variety of materials including nylon screen or mesh or various sheet fabrics such as polyester. Flexible material 102 has a top surface 103, bottom surface 104 and four side surfaces 105. Mesh or holes 110 are located in flexible material 102. Mesh 110 allows air to pass through flexible material 102 reducing airflow resistance and also reducing flapping noises while moving. Sleeves 112 are located on one of sides 105. Sleeves 112 define a tubular opening 114. A cutout area 116 is also located in flexible material 102. Sleeves 120 are located on another side 105 of flexible material 102. Sleeves 120 define a tubular opening 122. A cutout area 124 is also located in flexible material 102.

Figure 3:
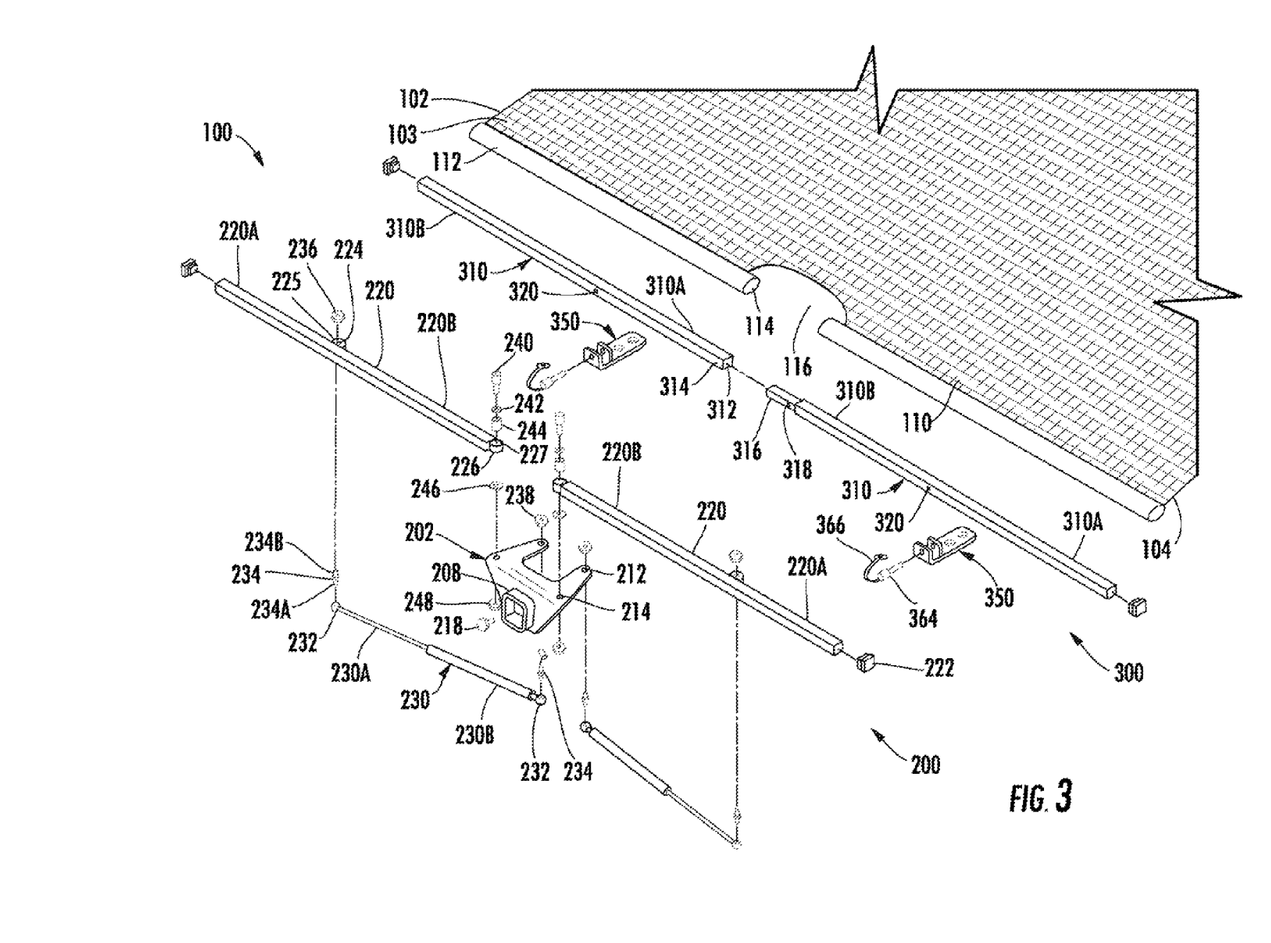
FIG. 3 is substantially an exploded isometric view of a towed vehicle protection device in accordance with the present invention.
Figure 5:
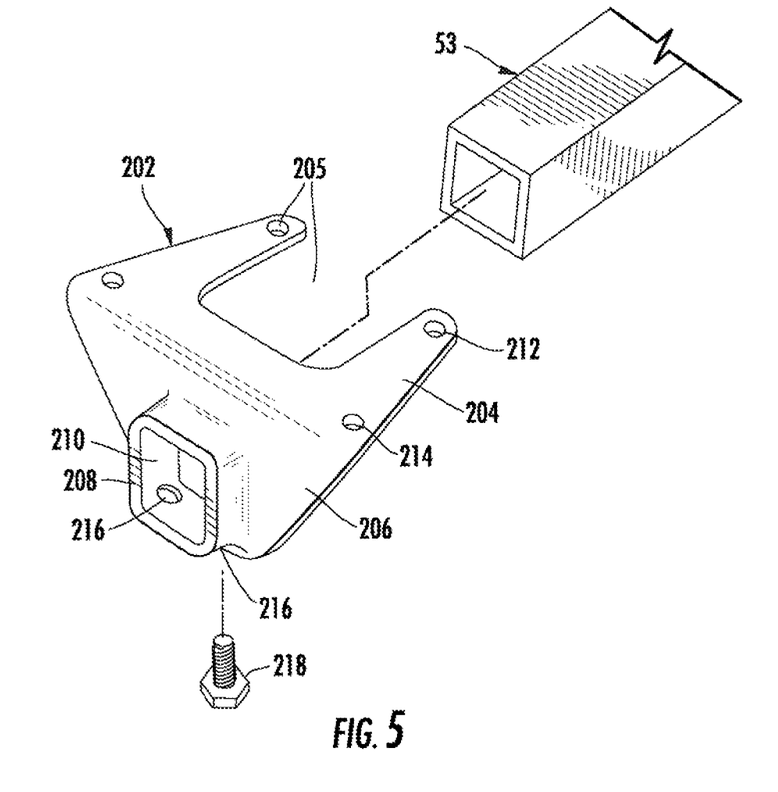
FIG. 5 is substantially an enlarged view of a collar in the towed vehicle protection device of FIG. 3

Protection device 100 may further include moveable support means, such as a moveable support 200 that is connected with or over sleeves 112 of flexible material 102. With reference now to FIGS. 3 and 5, moveable support 200 can include a collar 202. Collar 202 has a top plate 204 and side plate 206. Collar 202 can be formed from a metal such as steel. Top plate 204 and side plate 206 are connected together and are substantially perpendicular to each other. Plates 204 and 206 can be joined by welding. A U-shaped slot 205 is located in top plate 204.

A flange 208 is mounted to side plate 206 and surrounds an opening 210. Flange 208 may be welded to side plate 206. Holes 212 and 214 are located in top plate 204. Holes 216 are located in flange 208. Holes 212 and 214 are located in top plate 204. Opening 210 is located in flange 208.

Collar 202 can be mounted to a towing vehicle member such as towbar stinger 53. Collar 202 is mounted with slot 205 facing away from towing vehicle 20 and flange 208 facing toward towing vehicle 20. Collar 202 slides over towbar stinger 53. Towbar stinger 53 passes through opening 210. A pair of holes 216 are located in flange 208. Bolts 218 can be fastened in holes 216 and tightened in order to retain collar 202 to towbar stinger or hitch extension 53.

Moveable support 200 may further include a pair of arms 220 that have ends 220A and 220B. Arms 220 can be formed from a metal such as steel. A protective cap 222 can be mounted to end 220A. A rib 224 extends from the middle of arm 220 and has a through hole 225. A tube 226 is attached to end 220B and has a through hole 227.

A biasing device such as a pair of conventional gas springs or struts can be attached to moveable support 200. A gas spring is a type of spring that, unlike a typical metal spring, uses a compressed gas, contained in a cylinder and variably compressed by a piston, to exert a force. Gas springs are used in automobiles, where they are used to support the weight of vehicle doors while they are open. Gas spring 230 has ends 230A and 230B. End 230A may be a metal shaft and end 230B can be a hollow cylinder that contains the compressed gas and a piston.

Figure 7:
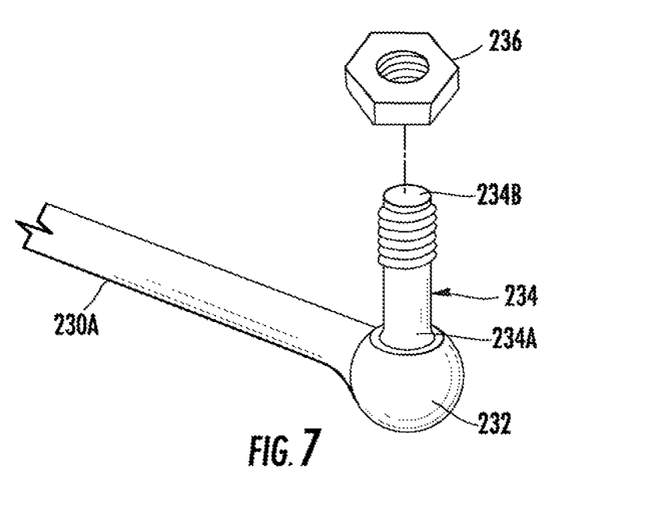
FIG. 7 is substantially an enlarged view of a ball joint in the towed vehicle protection device of FIG. 3.

With additional reference now to FIG. 7, a ball socket 232 may be attached to both ends 230A and 230B. A ball joint 234 can fit into and be retained for rotational movement by each of ball sockets 232. Ball joint 234 can be press 111 into ball socket 232. Ball joint 234 has a ball, end 234A and a threaded end 234B. Threaded end 234B passes through hole 227 of arm 220 and is fastened to arm 220 with a nut 236.

Moveable support 200 is coupled with collar 202. Arms 220 are rotatably attached to collar 202 by bolts 240. Bolt 240 extends through washer 242, bushing 244, washer 246, hole 214 and is fastened by nut 248. Bushing 244 is retained within hole 227 and allows arm 220 to rotate about bolt 240.

Gas springs 230 bias moveable arms 220 toward towing vehicle 20. When towing vehicle 20 turns, the distance between the vehicles decreases in the direction of the turn and increases on the side opposite the direction of the turn.

Fixed support means, e.g. fixed support 300, can include a pair of arms 310 having ends 310A and 310B. Cap 222 can be mounted to end 310A. A bore 312 may extend into end 310B. Hole 314 passes through end 310B. A neck 316 extends from one of ends 310B. A spring plunger 318 can be located in neck 316. Neck 316 can fit into bore 312 such that spring plunger 318 pops up through hole 314. In this manner, spring plunger 318 retains arms 310 together. A hole 320 may extend through arm 310.

Arms 310 slide into aperture 122 and support sleeves 120. Arms 310 hold and support one of sides 105 of flexible material 102. Arms 310 may be attached to brackets 350 that are further attached to towbar brackets 44.

Figure 6:
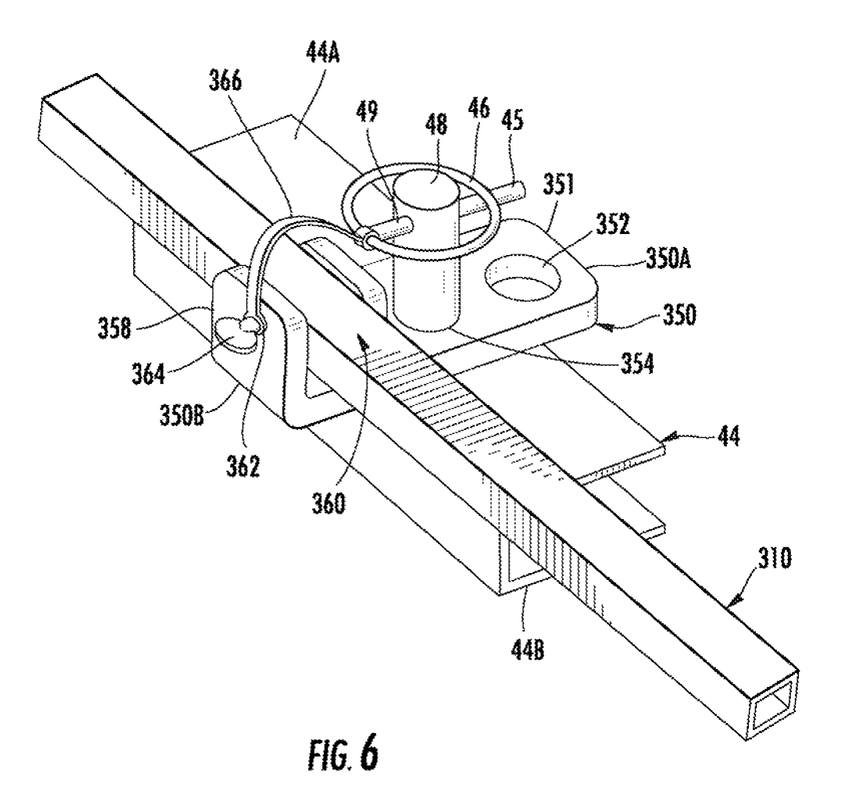
FIG. 6 is substantially an enlarged view of a bracket assembly in the towed vehicle protection device of FIG. 3.

Turning now to FIG. 6, an enlarged view of fixed support 310 and brackets 350 and 44 is shown. Brackets 350 may have ends 350A, 350B and a base 351. Brackets 350 can further have holes 352 and 354. A pair of walls 358 extend upwardly from base 351 and define a slot 360. Bracket 350 may be formed from any suitable material such as steel. Bracket 44 may have a stud 48 that extends upwardly from bracket 44 and has a hole 49 that extends through stud 48.

Bracket 350 may be attached to towbar bracket 44 by sliding hole 354 over stud 48 and inserting lynch pin 45 through hole 49 and looping ring 46 over stud 48. In this manner bracket 350 is retained by towbar bracket 44.

Fixed support 300 can be attached to brackets 350. Arms 350 may be placed into slot 360 between walls 358. Arms 310 are retained within slot 360 by inserting safety pins 364 through holes 502 and holes 320. A retaining wire 366 can be fastened to an end of safety pin 364 in order to retain safety pin 364 in holes 320 and 362.

Method of Installation

With reference to FIGS. 1-6, protection device 100 can be installed between towing vehicle 20 and towed vehicle 40 by the following sequence of steps:

1. Mount collar 202 to towbar stinger 53 and tighten bolts 218.
2. Attach the towbar stinger 53 to hitch 24.
3. Place bracket 350 over studs 48 by inserting studs 48 through holes 354 and fastening and locking lynch pin 45 and ring 46.
4. Unroll flexible material 102 over towbar 50 between vehicles 20 and 40 by unrolling arms 310.
5. Slide arms 310 into slots 360.
6. Insert safety pins 364 into holes 362 and 320.
7. Attach retaining wires 366 to safety pins 364.

Protection device 100 may be removed by reversing the order of steps 1.-7. After protection device 100 is rolled up on arms 310, it is in a position for storage adjacent back end 22. Flexible material 102 may be rolled in to a roll and retained for storage by a pair of straps 107 (FIG. 2) that are placed around the roll and attached to arms 220.

Operation

Protection device 100 protects towed vehicle 40 from damage due to rocks and road debris being picked up by towing vehicle 20 and deposited on towed vehicle 40 while both vehicles are in motion.

Flexible material 102 is mounted between moveable support 200 and fixed support 300. Fixed support 300 supports one side of flexible material 102 above towbar 50. Fixed support 300 does not rotate or move after it has been secured in slot 360. Moveable support 200 supports another side 105 of flexible material 102 above towbar 50. Moveable support 200 allows flexible material 102 to flex and bend during maneuvers such as turns of vehicles 20 and 40.

Gas springs 230 bias moveable arms 220 toward towing vehicle 20. When towing vehicle 20 turns the distance between the vehicles decreases in the direction of the turn and increases on the side opposite the direction of the turn. During a turn, one arm 220 will pivot or rotate toward fixed arm 310 causing one side 105 of flexible material 102 to droop or sag between vehicles 20 and 40. At the same time, the other arm 220 will rotate away from motor home back end 22 with flexible material 102 being maintained in a taut manner.

After the turn is completed and vehicles 20 and 40 are aligned so as to travel in a straight direction, biasing device 230 moves arm 220 away from arm 210 back toward the its original position, causing flexible material 102 to tighten removing any drooping or sagging portions.

In this manner, protection device 100 allows for towing vehicle 20 to turn while towing vehicle 40 is being towed. At the same time, protection device 100 allows flexible material 102 to bend and then return to a normal or original position after the turn is completed.

CONCLUSION

The present invention provides a protection device that can be mounted between a towing vehicle and a towed vehicle to protect the towed vehicle from damage due to stones and road debris. The protection device is adapted to move during turns and then return to an original position.

Although the description above contains many specifications, these should not be construed as limiting the scope of the invention but as merely providing illustrations of some of the embodiments of this invention. Thus, the scope of the invention should be determined by the appended claims and their legal equivalents rather than by the examples given.

What is claimed is:

1. A protection device for a towed vehicle comprising:
   (A) a collar comprising at least a first plate comprising an aperture that receives a towbar stinger of a towing vehicle, thereby mounting the collar on the towbar stinger of the towing vehicle;
   (B) a first support comprising a first arm and a second arm that are each directly rotatably attached to the same collar such that the first arm and second arm each rotate relative to the collar;
   (C) a second support, the second support being adapted to be coupled with a towed vehicle member;
   (D) a flexible material coupled between the first and second supports; and
   (E) a biasing device coupled with the first arm and the second arm, the biasing device being adapted to bias rotation of at least one of the first arm and the second arm away from the second support to maintain the flexible material in a taut manner.

2. The protection device of claim 1, wherein the biasing device is adapted to bias rotation of at least one of the first arm and the second arm with respect to the collar.

3. The protection device of claim 1, wherein the flexible material has a sleeve, the sleeve being mounted over the first and second arms.

4. The protection device of claim 1, wherein the biasing device is a gas spring.

5. The protection device of claim 1, wherein at least one bracket is coupled to the second support.

6. A method of protecting a towed vehicle comprising, but not necessarily in the order shown:
   (A) mounting a moveable support to a towbar stinger of a towing vehicle by passing the towbar stinger through an aperture of a collar of the moveable support, the moveable support comprising a first arm and a second arm directly rotatably attached to the collar;
   (B) attaching a fixed support to a towed vehicle;
   (C) attaching a flexible member between the moveable support and the fixed support; and
   (D) biasing the moveable support with a biasing device such that at least one of the first arm and the second arm is biased to rotate relative to the collar away from the fixed support.

7. The method of claim 6 further comprising of attaching a safety pin to the fixed support.

8. The method of claim 6 further comprising of attaching a bracket to a towed vehicle member.

* * * * *